United States Patent
Sasaki et al.

(10) Patent No.: US 10,382,082 B2
(45) Date of Patent: Aug. 13, 2019

(54) COVER SYSTEM FOR PROTECTION OF A DEVICE

(71) Applicant: STMEC, LLC, Poway, CA (US)

(72) Inventors: Jeff Sasaki, San Diego, CA (US); Danny Yu, San Bruno, CA (US)

(73) Assignee: STMEC, LLC, Poway, CA (US)

( * ) Notice: Subject to any disclaimer, the term of this patent is extended or adjusted under 35 U.S.C. 154(b) by 0 days.

(21) Appl. No.: 15/688,654

(22) Filed: Aug. 28, 2017

(65) Prior Publication Data

US 2019/0068230 A1    Feb. 28, 2019

(51) Int. Cl.
*A45C 11/00* (2006.01)
*H04B 1/3888* (2015.01)

(52) U.S. Cl.
CPC ...... *H04B 1/3888* (2013.01); *A45C 2011/002* (2013.01)

(58) Field of Classification Search
None
See application file for complete search history.

(56) References Cited

U.S. PATENT DOCUMENTS

| | | |
|---|---|---|
| D565,291 S | 4/2008 | Brandenburg |
| D656,494 S | 3/2012 | Bau |
| D663,294 S | 7/2012 | Buxton |
| D670,279 S | 11/2012 | Veltz |
| D671,933 S | 12/2012 | Rodgers |
| D679,684 S | 4/2013 | Baker |
| 8,584,847 B2 | 11/2013 | Tages |
| 8,616,422 B2 | 12/2013 | Adelman |
| D701,211 S | 3/2014 | Ng |
| D709,486 S | 7/2014 | Lin |
| D711,362 S | 8/2014 | Poon |
| D712,387 S | 9/2014 | Tompkin |
| D714,278 S | 9/2014 | Case |
| D716,280 S | 10/2014 | Macrina |
| D726,170 S | 4/2015 | Ng |
| 9,060,580 B2 | 6/2015 | Tages |
| D733,696 S | 7/2015 | Burgett |
| D737,262 S | 8/2015 | Jia |
| 9,176,532 B2 | 11/2015 | Tages |

(Continued)

OTHER PUBLICATIONS

Supcase Unicorn Beetle Max Protection Case, YouTube1, Apr. 2017 https://www.youtube.com/watch?v=iYt88584R9c*

(Continued)

*Primary Examiner* — Jianxun Yang
(74) *Attorney, Agent, or Firm* — Holzer Patel Drennan

(57) ABSTRACT

A cover system that may be used for protection of a device such as a smart phone, tablet, or the like. The system includes a body and a cover. The cover may be arranged in a first configuration where the cover is engaged with a first side of the body or a second configuration where the cover is engaged with a second side of the body. The cover may be removable from the body for converting between the first configuration and the second configuration. In the first configuration, the cover may be arranged on a rear of the body and in the second configuration, the cover may be arranged on a front of the body to protect a display of a device retained within the body. As such, additional protection may be selectively provided to the front of a device (e.g., near the display of the device).

16 Claims, 11 Drawing Sheets

(56) References Cited

U.S. PATENT DOCUMENTS

| | | |
|---|---|---|
| D745,866 S | 12/2015 | Adelman |
| D755,764 S | 5/2016 | Dong |
| D761,780 S | 7/2016 | Nguyen |
| D763,853 S | 8/2016 | Pearce |
| D763,857 S | 8/2016 | Dang |
| D765,085 S | 8/2016 | Moore |
| D769,855 S | 10/2016 | Deng |
| D780,166 S | 2/2017 | Lin |

OTHER PUBLICATIONS

Theresastrading Flip Kickstand, Youtube2, 2015 https://www.youtube.com/watch?v=--8WqCz32VA.*

* cited by examiner

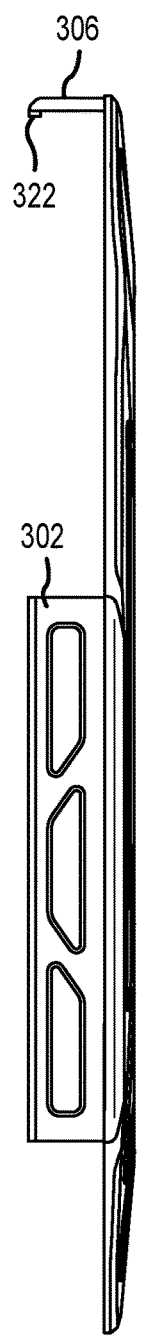
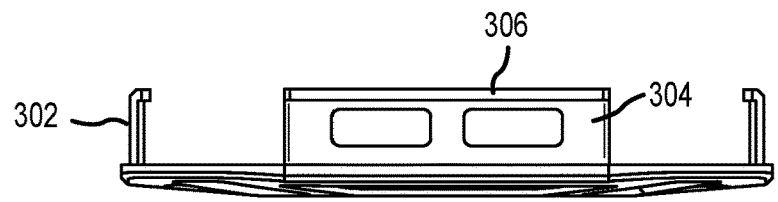
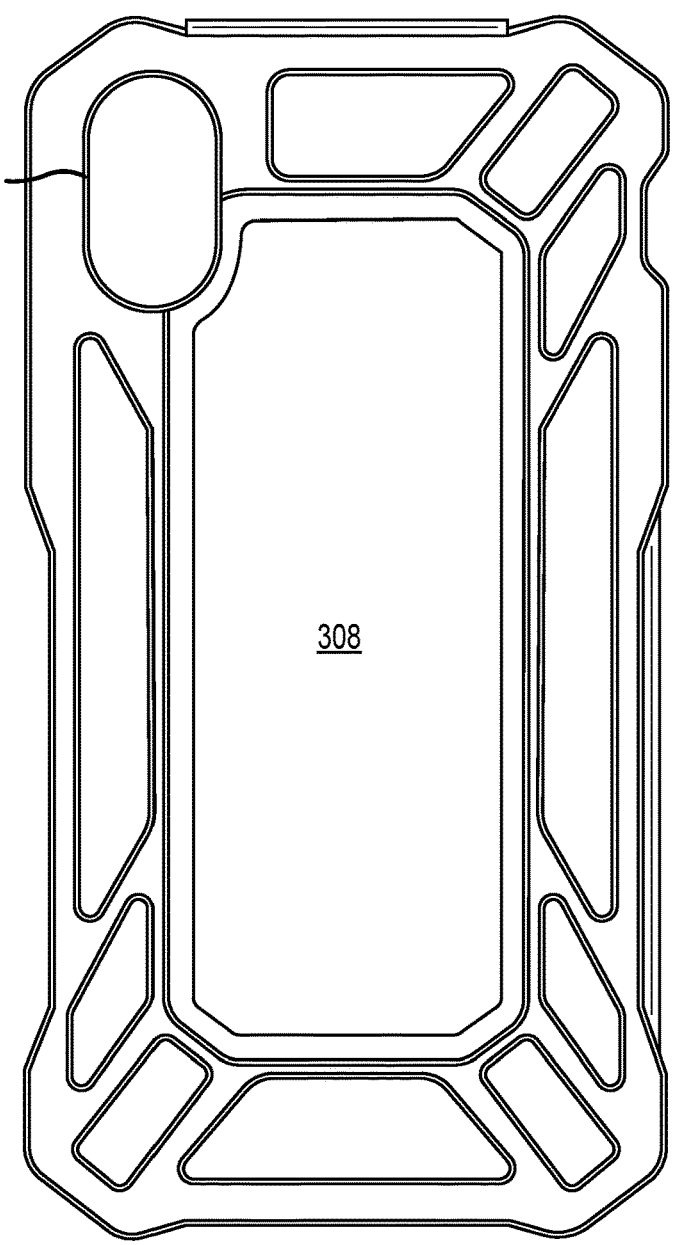
FIG.12
FIG.13　　　FIG.11

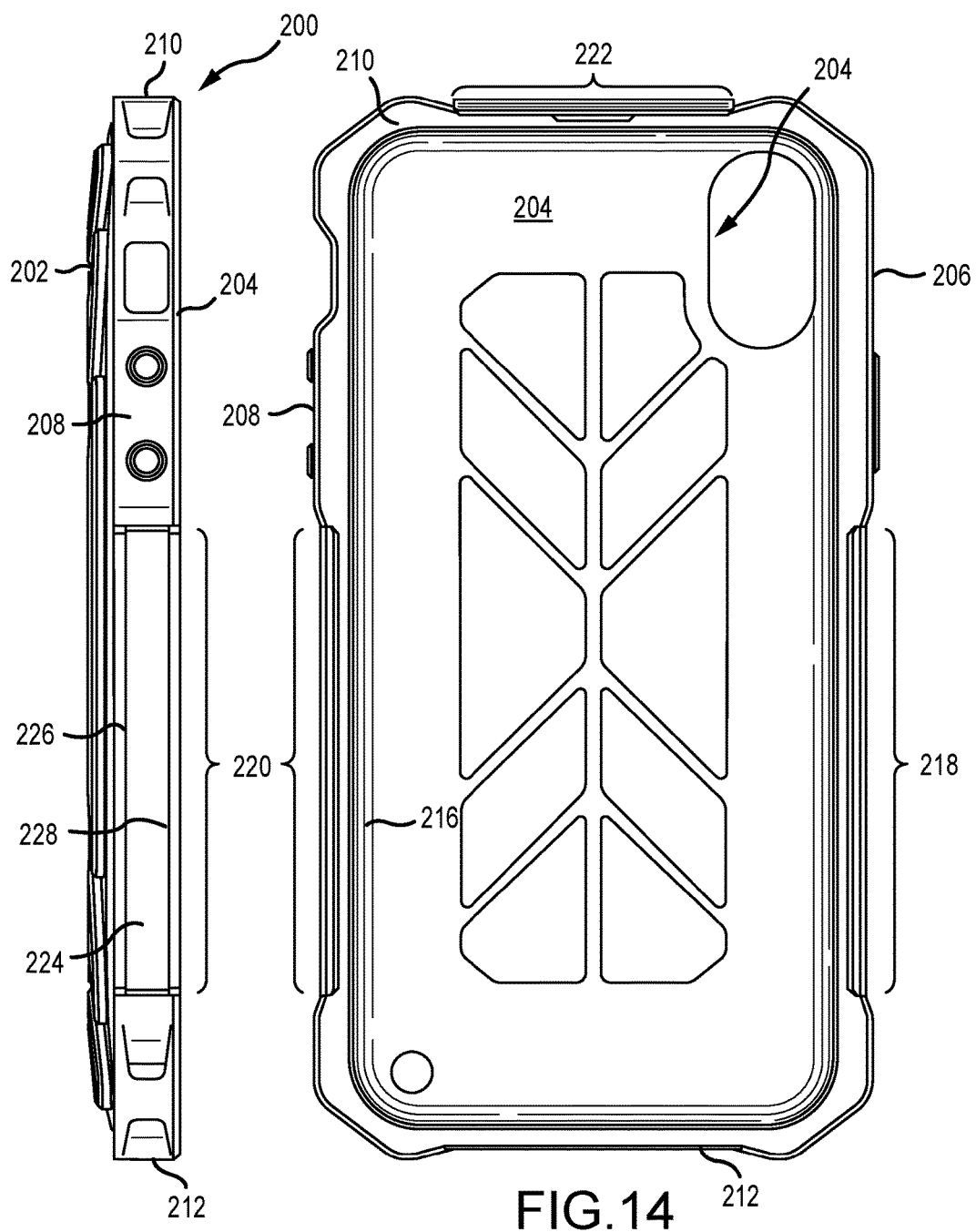
FIG. 14
FIG. 15
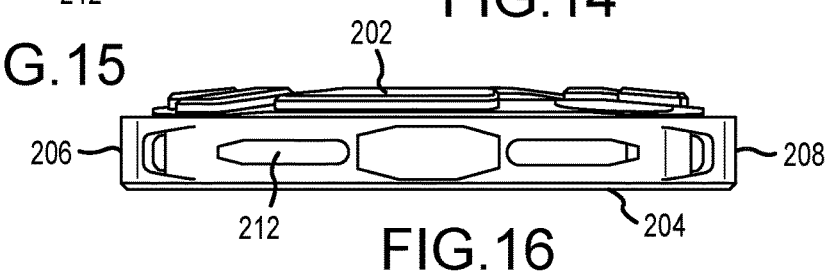
FIG. 16

COVER SYSTEM FOR PROTECTION OF A DEVICE

BACKGROUND

Many mobile device users protect their devices by using some form of a case into which the device may be at least partially disposed. These mobile devices may include, for example, smart phones, tablets, and the like. Cases for these devices may provide protection in a number of aspects. The cases may physically cover the device such that surface scratches or other cosmetic damage may be prevented. Cases may also provide a measure of impact absorption to avoid damage due to drops or the like. Further still, cases may extend relative to components (such as the device display, camera lens, or other feature) to prevent damage to those specific components.

A number of design considerations are important to consider in relation to such cases. For instance, many users desire that the case not interfere with functionality associated with the device to be protected. As such, cases have been adapted to allow access to various features such as cameras, buttons, sensors, or other components. Further still, many users desire not to have a case that adds significant bulk to the device to be protected. As may be appreciated such design considerations may present tension in relation to the fundamental objective of protection of the device.

SUMMARY

In view of the foregoing, the present application is directed to a protective cover system that may include or be used in conjunction with a device to provide protection to the device. The system includes a cover that may be selectively engaged with either one of opposing first and second sides of a body. The body may be adapted to retain a device. For instance, the body may extend about at least a portion of the device such that, for example, a display (e.g., a touch sensitive display) of the device is exposed by the body through an opening on a side of the body. In turn, the cover, when engaged in a first configuration on a first side of the body may allow the display of the protected device to be exposed (e.g., to allow for a user to interface with the display). When in a second configuration where the cover is engaged on a second side of the body, the cover may include a panel that extends relative to the opening such that, for example, a portion of the display is covered, and thus protected, by the panel of the cover. That is, a reversible cover is provided that may be selectively attached to a first side (e.g., a rear side) of the body or a second side (e.g., a front side) of the body.

Such a configuration may allow for a user to engage the cover with the second side in situations or contexts in which additional protection of the device is desired, particularly when additional protection for the display of the device is desired. Many devices have a display that may extend along a majority or nearly all of a first or front side of a device. As the display may represent the primary interface with the device, it may be desirable to provide a case that allows access to the display to prevent interference to interaction with the device. However, as the display may represent a large surface area of the front side of the device, allowing it to be relatively exposed, and therefore unprotected, by the case may present vulnerabilities such as impacts that shatter or scratch the display. By utilizing the cover system described herein, additional protection may be selectively provided for the display of the device by disposing the cover in the second configuration such that it extends relative to the display of the device.

When such additional protection is not desired or the user wishes to interface fully with the display, the cover may be disposed in the first configuration that engages the first side of the body. By providing the first configuration in which the cover is engaged with the first or rear side of the body, the display may be substantially unobstructed. However, the cover may continue to be engaged by the body such that a user need not keep track of or otherwise store the cover when not in use. Also, when in the first configuration, the cover may provide further protection to the first side of the body. In certain embodiments described herein, the first side and cover may each have coordinating features such that when the cover is engaged with the first side of the body, the cover is maintained within an envelope defined by the body such that the cover does not add thickness or bulk to the system when in the first configuration. For instance, the cover may nestingly engage with the first side of the body when in the first configuration.

As will be described in greater detail below, the body and cover may have coordinating engagement portions and engagement features, respectively, that allow the cover to engage the body on the first or second side of the body. As may be appreciated, given the fact that the cover is reversibly engageable from the first side to the opposite second side, the engagement portions and/or engagement features may be mirrored on opposite sides of the body and/or cover to facilitate engagement with either the first side or the second side. For instance, the body may include engagement portions that are engaged by the engagement features in a first direction when in the first configuration and those same engagement portions may be engaged in a second direction when in the second configuration. The cover may have a substantially identical outer perimeter to the outer perimeter of the body. In turn, regardless of whether disposed in the first or second configurations, the cover and body may coordinate to appear as a unitary case that extends relative to the device for covering and protection thereof.

A first aspect of the disclosure includes a protective cover system for use in protecting a device. The system includes a body and a cover. The body includes a first side and a second side and defines a recess having an opening that is open toward the second side. The recess is sized to receive at least a portion of a device therein. The system also includes a plurality of engagement portions defined by the body. In turn, the cover includes a plurality of engagement features corresponding to the plurality of engagement portions. The engagement features are operative to engage the plurality of engagement portions to secure the cover to the first side of the body in a first configuration and the second side of the body in a second configuration.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in an embodiment, respective ones of the plurality of engagement portions may be disposed on opposite lateral side portions of the body extending between the first side and the second side. In turn, the system may also include a plurality of extension members that extend from the cover that align with the engagement portions on the lateral portions of the body in the first configuration and the second configuration.

In an embodiment, at least one of the plurality of engagement portions may be disposed on a transverse side portion extending between the lateral side portions of the body. The cover may include a corresponding extension member that extends from the cover that aligns with the at least one of the plurality of engagement surfaces on the transverse side portion when the cover is in the first and second configuration.

The cover may be secured to the body in either the first or second configuration by latching engagement of the cover to the body. As such, corresponding respective ones of the plurality of extension members and the plurality of engagement portions may engage to latch the cover to the body in either the first configuration of the second configuration. For instance, the extension members may comprise a latch that interfaces with a shoulder of a ridge provided on the body to prevent withdrawal of the cover from the body once engaged.

In an embodiment, the plurality of extension members may each extend along at least a portion of the length of opposite side portions of the cover. The extension members may extend for a common distance on the respective opposite side portions of the cover. Specifically, the rails may be mirrored on the opposite sides of the cover to engage correspondingly mirrored engagement portions on the body to facilitate securing the cover to the body in the first configuration and the second configuration.

In this regard, the body and the cover may be coordinated to present a unitary appearance and functionality. For instance, the cover comprises an outer perimeter that is substantially coextensive with an outer perimeter of the body. This may assist in providing a cohesive design or appearance to the cover and body as well as allow the cover to provide coverage for protection to the full extent of a side of the body.

The cover may be completely removable from the body when converting from the first configuration to the second configuration. In this regard, the body may be used without the cover. Further still, the cover, when in the first configuration may allow the cover to be stowed without obstructing access to the device through the opening. However, in at least some embodiments, the cover may extend relative to the recess when in the second configuration to at least partially cover a portion of the opening. As such, the cover may include a panel defined by the cover that extends generally parallel to the first side in the first configuration and the second side in the second configuration. The panel may extend relative to the opening when in the second configuration to cover at least a majority of the opening.

Also, when in the first configuration, the cover may nestingly engage with the body to reduce the additional thickness or bulk resulting from using the cover system with a device. Specifically, the system may include at least one raised portion extending from the first side of the body. In turn, the cover may include at least one corresponding recess into which the at least one raised portion extends when the cover is in the first configuration. The at least one corresponding recess may include an aperture extending through an entire thickens of the cover. In this regard, the at least one raised portion may extend through the aperture such that a distal surface of the raised portion is substantially flush with an exterior surface of the cover opposite an interior surface adjacent to the body when the cover is in the first configuration. As such, when the cover is in the first configuration, the nesting engagement of the at least one raised portion and the aperture may reduce the bulk or thickness of the system.

When in the second configuration, it may still be advantageous to allow for some interaction with a display that accessible through the opening of the body. As such, when in the second configuration, at least a portion of a display of a device disposed within the recess may be visible through the aperture. Furthermore, a user may be operative to touch the display through the cover to facilitate interaction with the display. Additionally or alternatively, the cover may include a window that, when the cover is in the first configuration, aligns with a hole in the body to provide access to a feature of a device disposed within the recess. For instance, the feature comprises a camera lens.

BRIEF DESCRIPTION OF THE FIGURES

FIGS. 8-13 are elevation views of an embodiment of a cover.

FIGS. 14-19 are elevation views of an embodiment of a body of a protective cover system.

DETAILED DESCRIPTION

Figure 1:
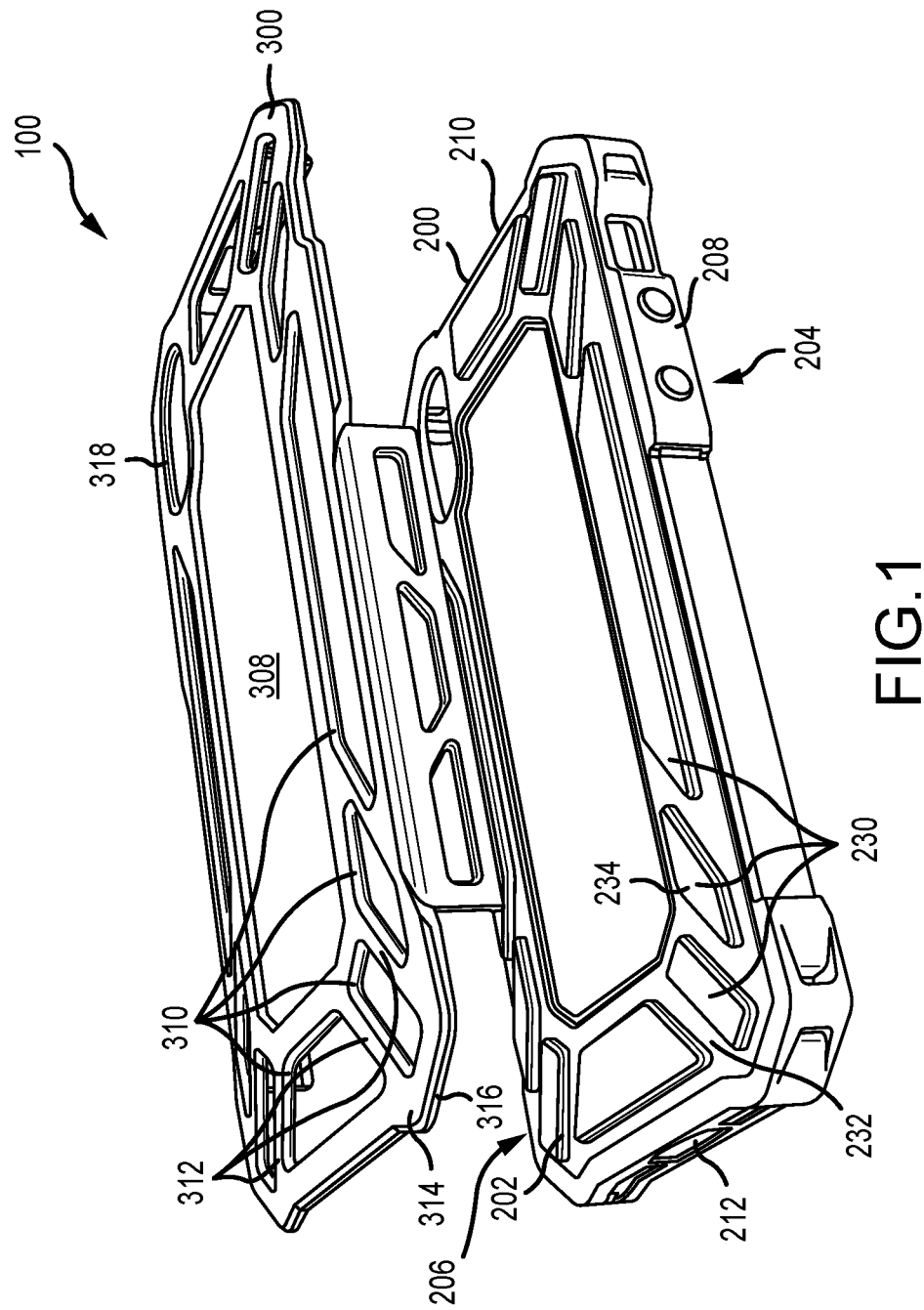
FIG. 1 is an exploded view of an embodiment of a protective cover system.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Figure 2:
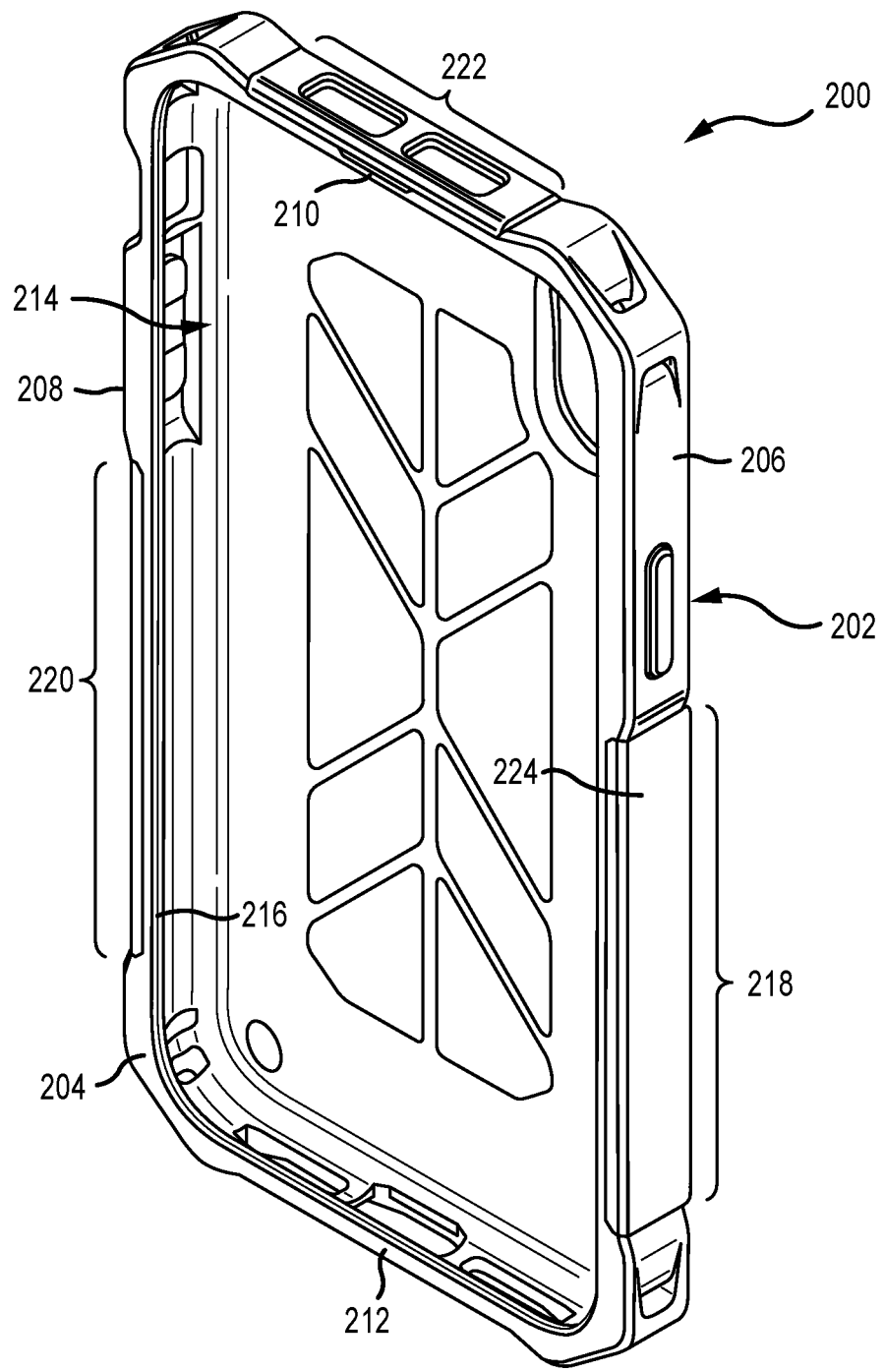
FIG. 2 is a perspective view of an embodiment of a body that may retain a device to be protected.

FIG. 1 depicts an exploded view of an embodiment of a cover protection system 100. The cover protection system 100 includes a body 200 and a cover 300. With additional reference to FIG. 2, the body 200 may include a first side 202 and a second side 204. The first side 202 may alternatively be referred to as a front side and the second side 204 may be referred to as a rear side. As may be appreciated from FIGS. 1 and 2, the first side 202 and the second side 204 may comprise major side portions. That is, the first side 202 and the second side 204 may correspond to major planar extents of the body 200. The body 200 may generally conform to a shape of a device to be retained within the body 200 such that the major surface portions of the device (e.g., the front and the back) may generally correspond to the first side 202 and the second side 204. In this regard, the length and width of the first side 202 and the second side 204 may be larger than a thickness of the body 200 measured normal to the first side 202 and the second side 204.

In addition to the first side 202 and the second side 204, the body 200 may include opposite lateral side portions 206 and 208. At least a portion of a first lateral side portion 206 may extend between the first side 202 and the second side 204. That is, the first lateral side portion 206 may extend from the rear of the body 200 to the front of the body 200.

In addition, at least a portion of a second lateral side portion 206 may extend between the first side 202 and the second side 204 (e.g., the second lateral side portion 206 may extend from the rear of the body 200 to the front of the body 200). The body 200 may further include a first transverse side portion 210 that extends between the lateral side portions 206 and 208 and between the first side 202 and the second side portion 204. A second transverse side portion 212 may extend between the lateral side portions 206 and 208 and between the first side 202 and the second side 204.

The body 200 may include a recess 214 that defines an opening 216 that is open toward the second side 204. The recess 214 may be sized to receive a device within the recess 214. The device 214 may be received within the recess 214 by passing the device through the opening 216. In other embodiments, the body 200 may comprise a plurality of discrete pieces that may be fitted to a device to retain the device with in the recess 214 defined by the plurality of discrete pieces. In any regard, the opening 216 may also provide access to the device when retained in the recess 214 (e.g., to interface with a display of the device that may be positioned relative to the opening). As such, the recess 214 may be at least partially defined by the lateral side portions 206 and 208 and the transverse side portions 210 and 212. The lateral side portions 206 and 208 and the transverse side portions 210 and 212 may generally extend along corresponding sides of a device retained in the recess 214. While the various side portions 206, 208, 210, and 212 may provide protection to the side of a device retained in the recess 214, the side portions 206, 208, 210, and/or 212 may not extend about the entirety of the recess 214. That is, various ones of the side portions 206, 208, 210, and/or 212 may include one or more cut-outs or other gaps such that the side portions 206, 208, 210, and/or 212 need not be provided continuously about the perimeter of the body 200 in all embodiments.

However, in at least some embodiments, the side portions 206, 208, 210, and 212 do form a continuous ring about a device retained in the recess 214, which may provide additional protection to the device retained in the recess 214. Additionally, one or more portions of the side portions 206, 208, 210, and/or 212 may extend relative to the opening 216 such that at least a portion of the side portions 206, 208, 210, and/or 212 may extend in a direction normal the second side 202 for some distance beyond the device retained in the recess 214. This may provide a "lip" that may assist in reducing contact with a display of a device retained in the recess 214. For instance, the lip defined by the side portions 206, 208, 210, and/or 212 may space the display of a device from a surface when the cover system 100 retaining the device is placed on a planar surface with the device's display oriented toward the planar surface.

Figure 3:
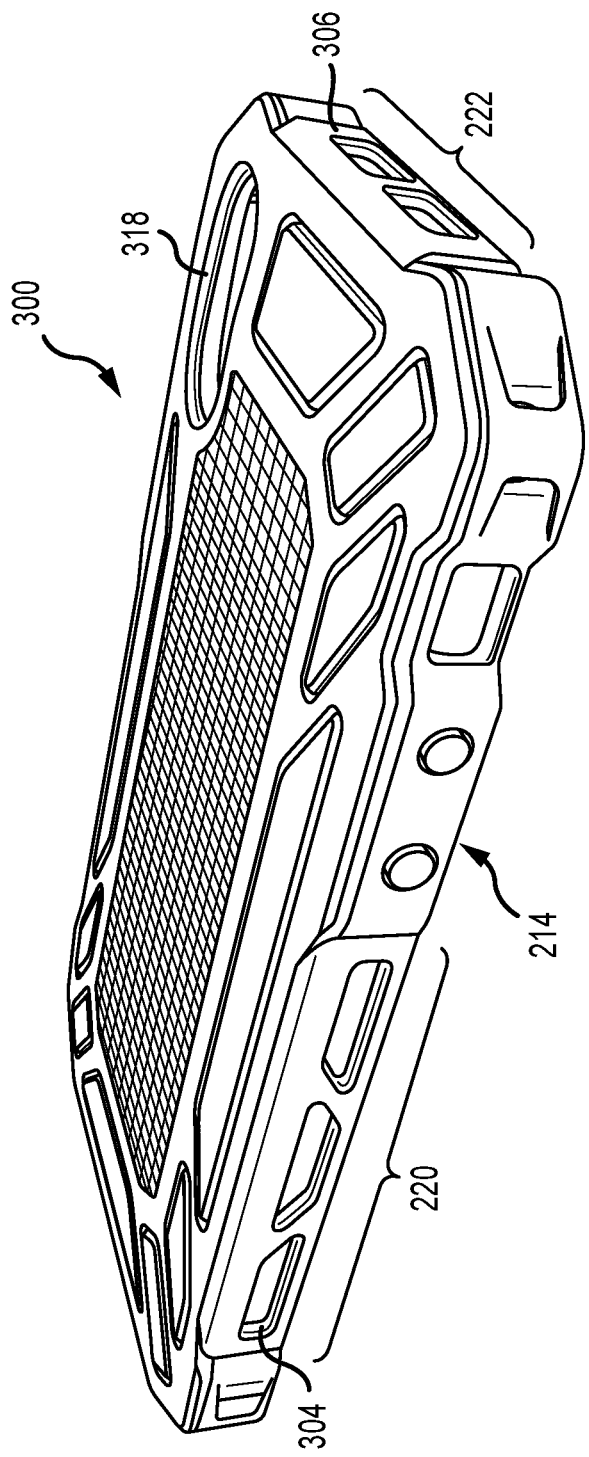
FIGS. 3-4 are perspective views of an embodiment of a protective cover system with a cover in a first configuration.
Figure 4:
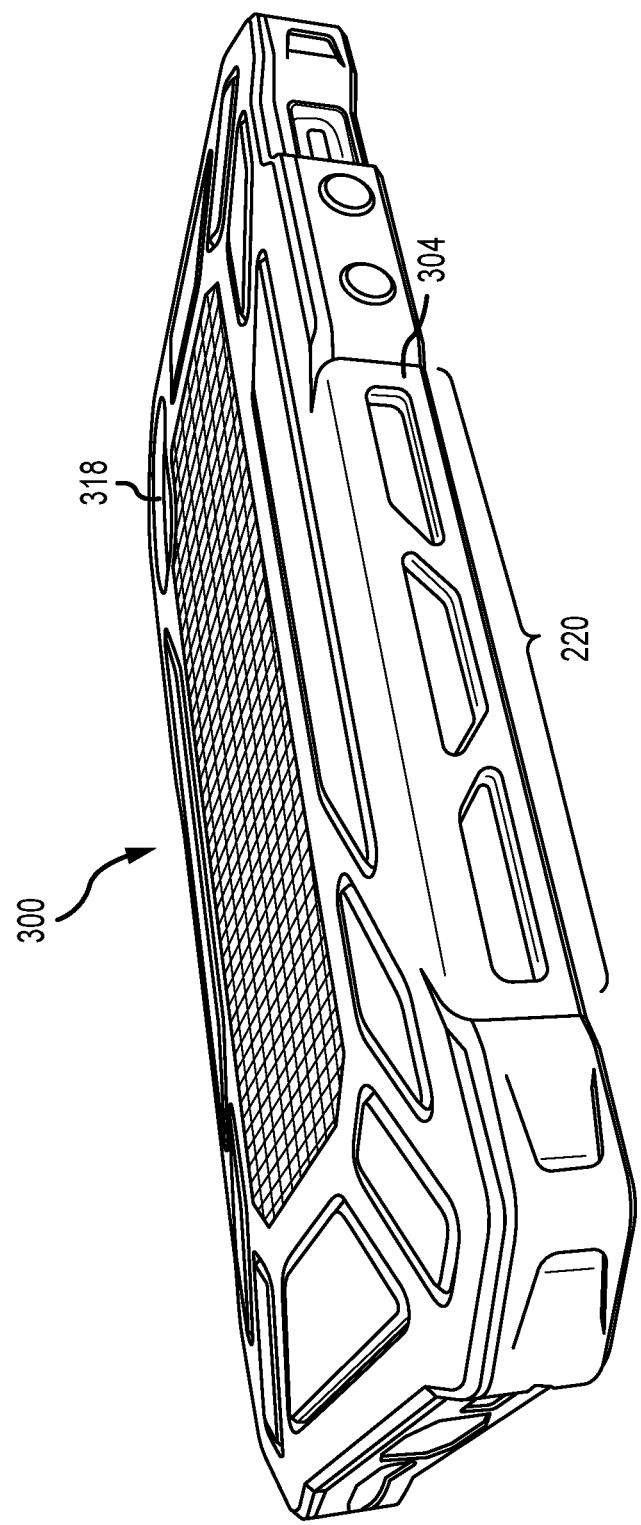

As described above, the cover 300 may be disposed in a first configuration (shown in FIGS. 3-4) in which the cover 300 may be engaged with the body 200 to dispose the cover 300 adjacent to the first side 202 of the body 200. The cover 300 may alternatively be disposed in a second configuration (shown in FIGS. 5-6) in which the cover 300 may be engaged with the body 200 to dispose the cover 300 adjacent to the second side 204 of the body 200. As may be appreciated from FIGS. 3-6, the cover 300 may have a shape generally corresponding to the body 200. For instance, the cover 300 may have an outer perimeter that is substantially coextensive with an outer perimeter of the body 200. Accordingly, when in the first configuration or the second configuration, the cover 300 and body 200 may provide a relatively integrated appearance.

The body 200 may comprise a first engagement portion 218 and a second engagement portion 220. The first engagement portion 218 may be defined in the first lateral side portion 206. The second engagement portion 220 may be defined in the second lateral side portion 208. In addition, the body 200 may comprise a third engagement portion 222 that may be defined in the first transverse side portion 210.

Figure 7:
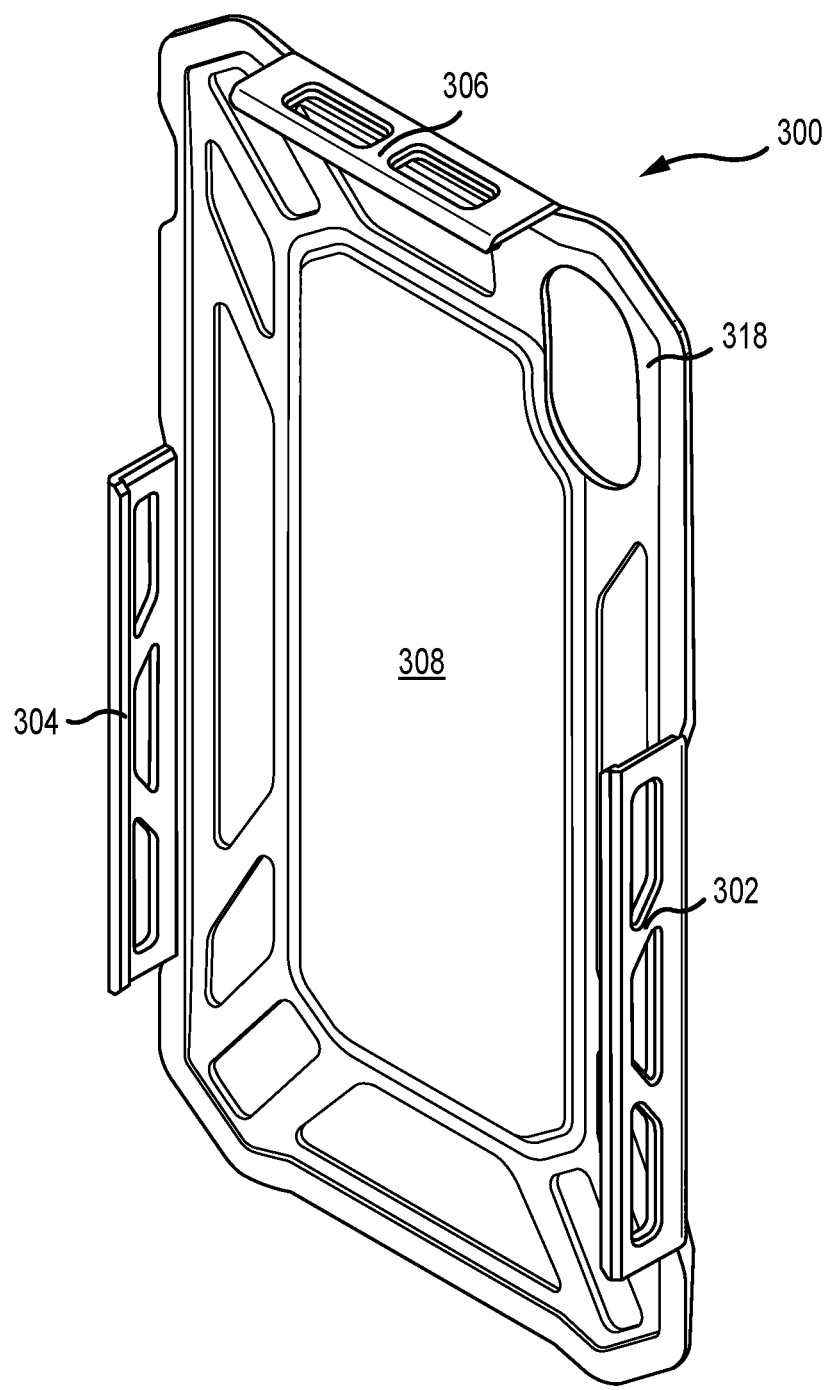
FIG. 7 is a perspective view of an embodiment of a cover of a protective cover system.

The cover 300 may have corresponding engagement features that may engage the engagement portions 218, 220, and/or 222 to retain the cover 300 in either the first configuration or the second configuration. With further reference to FIG. 7, the cover 300 may include a first extension member 302 that extends from the cover 300. The cover 300 may also have a second extension member 304 that extends from the cover 300. The cover may include a third extension member 306 that extends from the cover 300. Specifically, the extension members 302, 304, and 306 may extend relative to a panel 308 that is defined by the cover 300.

The extension members 302, 304, and/or 306, may extend along respective side portions of the cover 300. That is, the extension members 302, 304, and/or 306 may each for a length along the cover 300. Specifically, the first extension member 302 may along a first side of the cover 300 and the second extension member 304 may extend along a second side of the cover 300 opposite the first side. The first and second extension members 302 and 304 may extend for a common distance as shown in FIG. 7. As may be appreciated, the third extension member 306 may extend for a different distance along a side of the cover 300 between the sides along which the first and second extension members 302 and 304 extend.

Figure 5:
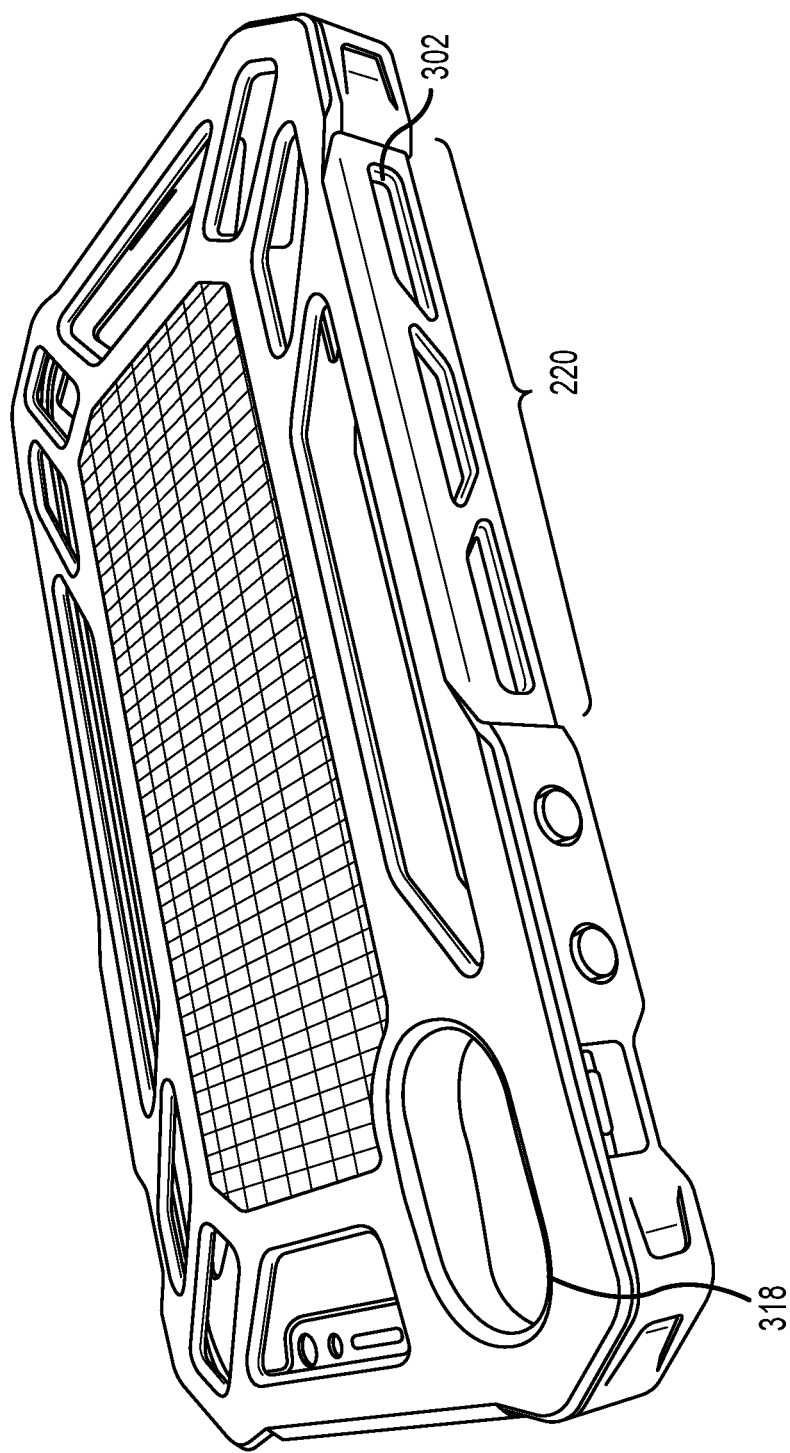
FIGS. 5-6 are perspective views of an embodiment of a protective cover system with a cover in a second configuration.
Figure 6:
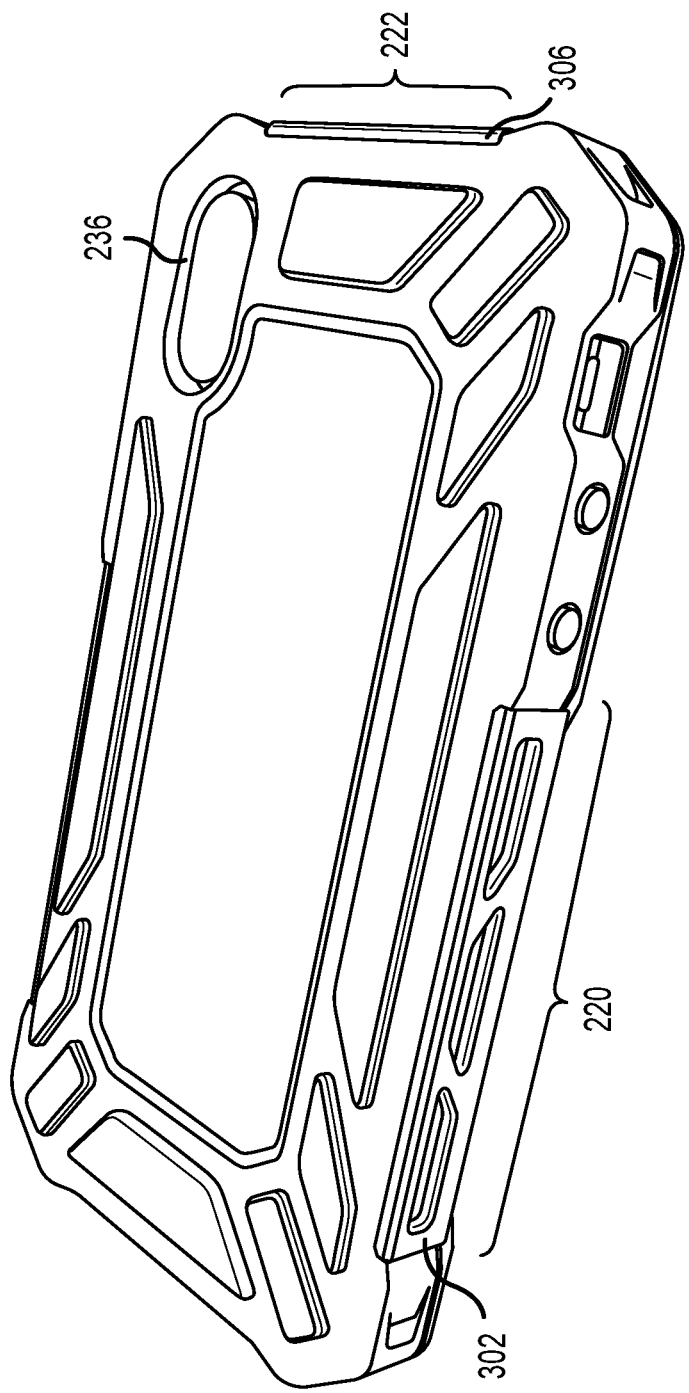

In any regard, the extension members 302, 304, and 306 may be alignable with the engagement portions 218, 220, and 222 in either the first configuration or the second configuration. For instance, in FIGS. 3-4, where the cover 300 is in the first configuration, the second extension member 304 may be aligned and engaged with the second engagement portion 220. In addition, the third extension member 306 may be aligned and engaged with the third engagement portion 222. While it cannot be seen in FIGS. 3-4, the first extension member 302 may be aligned and engaged with the first engagement portion 218. In FIGS. 5-6, where the cover 300 is in the second configuration, the first extension member 302 may be aligned and engaged with the second engagement portion 220. In addition, the third extension member 306 may be aligned and engaged with the third engagement portion 222. While it cannot be seen in FIGS. 5-6, the second extension member 304 may be aligned and engaged with the first engagement portion 218.

Figures 8, 9:
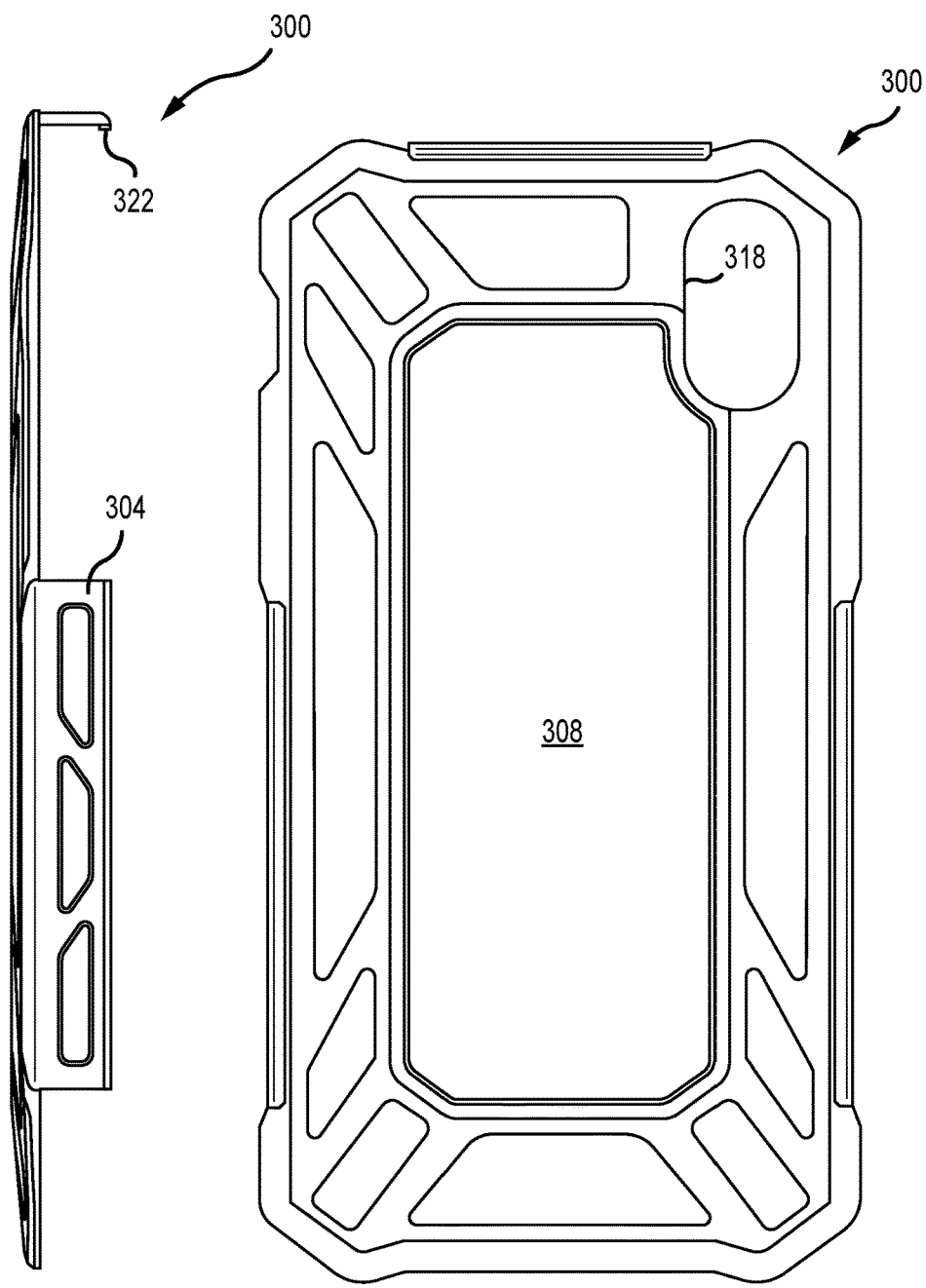
Figure 10:
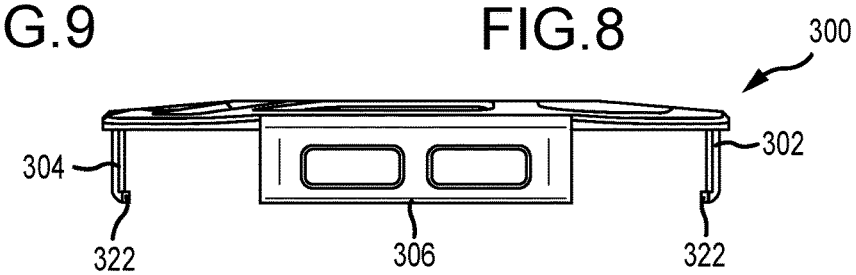
Figures 17, 18, 19:
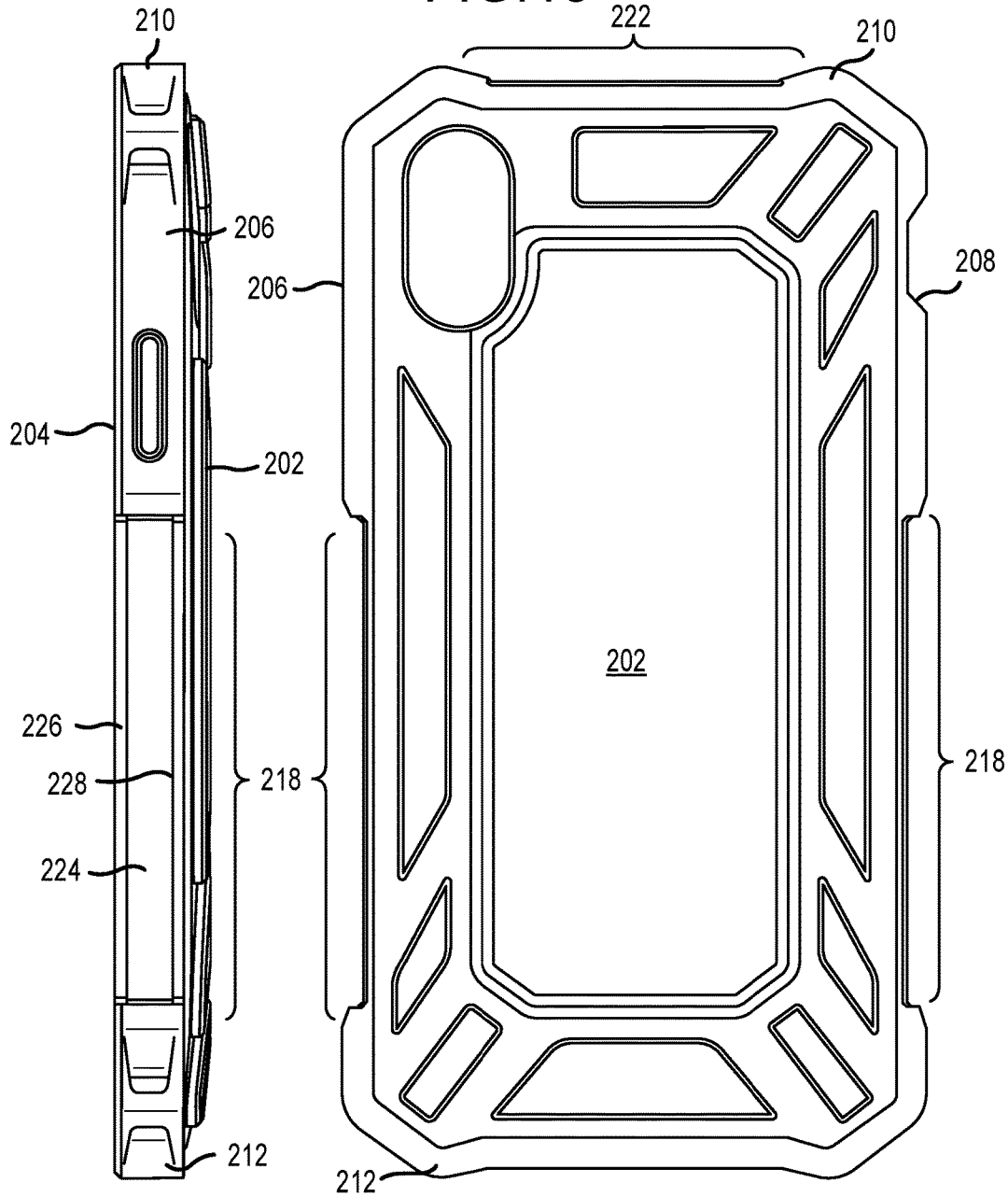

Specifically, the extension members 302, 304, and 306 may latch to engage corresponding ones of the engagement portions 218, 220, and 222. For instance, as best seen in FIG. 8, each of the extension members 302, 304, and 306, may include a latch 322. The latch 322 may be a portion of the respective extension member 302, 304, or 306 at a distal end thereof that extends toward a center of the cover 300 from the distal end of the extension member 302, 304, or 306. The engagement portions 218, 220, and 222 may each correspondingly include a ridge 224. The ridge 224 may define a first shoulder 226 and a second shoulder 228. The extension members 302, 304, and 306 may each be slightly deflectable away from the center of the cover 300. That is, the extension members 302, 304, and 306 may act as a living hinge that allows for deflection of the latches 322. In this regard, as the cover 300 is advanced relative to the body 200, the latches 322 on the respective extension members 302, 304, and 306 may deflect to allow the latch 322 to pass over the ridge 224.

Once the latch 322 clears a distal shoulder relative to the direction in which it is advanced, the latch 322 may deflect back towards the center of the cover 300 such that the latch 322 engages with the distal shoulder to prevent the cover 300 from being retracted. However, when it is desired that the cover 300 be removed from the body 200, one or more of the extension members 302, 304, or 306 may be deflected away from the center of the cover 300 such that the latch 322 of the respective extension member that is deflected may be allowed to be retracted relative to the distal shoulder and pass over the ridge 224 to allow for disengagement of the cover 300 and the body 200.

When in the first configuration, the cover 300 may be advanced from the first side 202 towards the second site 204 such that shoulder 226 corresponds to the distal shoulder over which the latch 322 of the respective engagement members 302, 304, and 306 engage with to restrict withdrawal of the cover 300 from the body 200. When in the second configuration, the cover 300 may be advanced from the second side 204 towards the first side 202 such that shoulder 228 corresponds to the distal shoulder over which the latch 322 of the respective engagement members 302, 304, and 306 engage with to restrict withdrawal the cover 300 from the body 200.

As the cover 300 may be engageable with either the first side 202 or the second side 204 of the body 200, it may be appreciated that at least a portion of the opposite portions of the cover 300 and/or body 200 may be mirrored such that the cover 300 may be engageable with either the first side 202 or the second side 204. For example, the engagement portions 218 and 220 may be mirrored on opposite lateral side portions 206 and 208 of the body 200. In this regard, the extension members 302 and 304 may be correspondingly disposed on opposite portions of the cover 300 such that the extension members 302 and 304 may latchingly engage corresponding ones of the engagement portions 218 and 220 to secure the cover in either the first configuration or the second configuration.

The mirroring of the components to allow for engagement in either the first configuration or the second configuration need not be strictly mirrored about a central datum of the body 200 and/or cover 300. For instance, the engagement portions 218, 220, and/or 222 and corresponding extension members 302, 304, and 306 may be arranged to allow for engagement in the first configuration and second configuration through additional; manipulation of the cover 300. That is, the cover 300 may be rotated or otherwise transposed between the first configuration and the second configuration to align the engagement portions 218, 220, and/or 222 with the extension members 302, 304, and/or 306.

While a latching interface is described above in which the latch 322 of the extension members 302, 304, and 306 latchingly engage the shoulder portion of the ridge 224 defined in the body 200, other mechanisms for securing the cover 300 to the body 200 may be provided. As may be appreciated from the discussion above, the extension members 302, 304, and 306 may act as a living hinge that allows for sufficient deflection of the latch 322 to be passed over the ridge 224 to engage a distal shoulder of the ridge 224 for securing the cover 300 of the body 200. However, an active hinge including a pivot member could also be provided that allows for selective engagement and disengagement of the latch 322 with the corresponding portion of the body 200 to retain the cover 300 on the body 200. Further still, additional interfaces such as interlocking portions that slide, move, or otherwise interface may be utilized to engage the cover 300 to the body 200. Any such engagement feature utilized may be mirrored about opposite lateral side portions of the body 200 and/or cover 300 to facilitate engagement of the cover in either the first or second configuration as described above. Further still, the cover 300 may include features that do not extend relative to lateral side portions of the body 200, but rather may engage the first side 202 and/or second side 204 of the body 200 to engage therewith.

As may be appreciated, the cover 300 may be completely removable from the body 200. This may facilitate use of the body 200 alone without utilizing the cover or for selective utilization of the cover 300. The complete removal of the cover 300 from the body 200 may also allow for the cover 300 to move between the first configuration and the second configuration (e.g., selectively based on the desire of the user). For instance, a device may be retained within the recess 214 such that an interactive display thereof as exposed to the opening 216 and the body 200. When a user wishes to interact with the interactive display of the device, the user may choose to dispose the cover 300 the first configuration such that it is adjacent the first side 202 of the body 200. This may allow the display of the device to be fully access through the opening 216 of the body 200. However, situations may arise in which the user desires additional protection for the device including, for example, additional protection of the display that is exposed through the opening 216. In these instances, the user may detach the cover 300 from the first configuration and reengage the cover 300 with the body 200 and the second configuration such that a panel 308 of the cover 300 extends at least partially over the opening 216 and may provide additional protection to the display of the device retained within the cavity 214.

As recognized above, one design consideration related to cases and covers for protection of mobile devices is the relative bulk that the case or cover adds to the device. Specifically, many mobile devices are designed with thickness as a critical dimension that is preferably minimized. In turn, adding a case or cover that adds to such thickness may be undesirable to certain individuals. Accordingly, the case 200 and cover 300 may include features that assist in reducing the overall thickness or bulk of the resultant system 100. With further reference to FIG. 1, the body 200 may include one or more raised portions 230 that extend from the first side 202 of the body 200. The cover 300 may include corresponding apertures 310. Specifically, the one or more raised portions 230 may be sized such that they extend through the apertures 310 when the cover 300 is disposed in the first configuration adjacent to the first side 202. The raised portions 230 may include a distal surface 234 at the distal extent of the raised portion 230 relative to the body 200. In an embodiment, the raised portions 230 may extend through the apertures 310 such that an exterior surface 314 of the cover 300 is at least substantially flush with the distal surface 234. By at least substantially flush with, it is meant that the exterior surface 314 of the cover 300 may not extend beyond the distal surface 234 when the cover 300 is in the first configuration engaged with the body 200 adjacent to first side 202. Described differently, the body 202 may include troughs 232 extending between the raised portions 230. The cover 300 may include strut members 312 extending between an outer portion 316 of the cover and the panel 308 of the cover that define the apertures 310. When the cover 300 is engaged with the body 200 in the first configuration, the struts 312 may lie within the trenches 232 defined on the first side 202 such that the struts 312 do not extend beyond the distal surface 234 in a direction away from the body 200. In this regard, when the cover 300 is engaged with the body 200, the cover 300 may be wholly contained within an envelope defined by the distal surfaces 230 for the raised portions 232 such that the cover 300 does not add to the overall thickness of the body 200 as measured between the distal surfaces 234 and the second side 204.

In other words, the cover 300 may nestingly engage the first side 202 of the body 200 such that the raised portions 230 nestingly engage the apertures 310 of the cover 300. While is described that the raised portions 320 may extend through the apertures 312 such that the distal surface 234 extends at least flush with or beyond the exterior surface 314, in alternative embodiments the raised portions 320 may engage apertures 310 of the cover and not extend entirely there through. That is, the cover 300 may include portions into which the raised portions 230 extend. However, the portions into which the raised portions 320 extend may not pass all the way through the cover 300. In any regard, the overall contribution to the thickness of the system 100 when the cover 300 is in the first configuration may be at least reduced by way of the nesting engagement of the cover 300 with at least a portion of the body 200 when disposed in the first configuration.

The cover 300 may also include a window 318. The window 318 may be aligned with a hole 236 in the body 200. The hole 236 may be disposed on the body 200 such that a feature of a device retained within the recess 214 of the body 200 may be aligned with the hole 236. For instance, the device may include a camera having a camera lens disposed on an exterior the device. The hole 236 may allow the camera lens of the device to be unobstructed when the device is retained within body 200. Furthermore, the window 318 in the cover 300 may be aligned with the hole 236 when the cover 300 is in the first configuration such that the camera lens maintains an unobstructed field-of-view when the cover 300 is in the first configuration. The window 318 and/or hole 236 of the cover 300 and body 200, including additional window 318/hole 236 combinations, may be provided to facilitate access to different features of the device. For example, buttons, interface portions, sensors, or other features the device may be accommodated by providing corresponding window 318 and hole 236 combinations in the cover 300 and body 200.

As a further example, the cover 300 may include a window 318 (which may correspond to an aperture 310 or be a separately defined passage through the cover 300) that may provide selective access to the device when the cover 300 is in the second configuration. As described above, the device retained within the cavity 214 of the body 200 may include a display that is accessible for interaction there with through the opening 216. While the cover 300 may obscure at least a portion of the display when the cover 300 is in the second configuration, window 318 in the cover 300 may allow for selective access to the display. For example, the display may have certain interaction portions that may be accessible through the window 318 when in the second configuration. As an example, an interface portion that allows a user to interact with the device (e.g., to accept a call, acknowledge an alert, unlock the device, or provide some other function related to interaction of the display) may be accessed through the window 318 when the cover 300 is in the second configuration. Accordingly, a user may be capable of leaving the cover 300 and the second configuration to maximize the protection provided to the display of the device retained within the cavity 214 of the body will still allowing some basic functionality to be performed using the interactive portion that is exposed to the window 318.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A protective cover system for use in protecting a device, comprising:
   a body having a first side and a second side, the body defining a recess having an opening that is open toward the second side, the recess being sized to receive at least a portion of a device therein;
   a plurality of engagement portions defined by the body, wherein respective ones of the plurality of engagement portions are disposed on the opposite lateral side portions of the body extending between the first side and the second side and at least one of the plurality of engagement portions is disposed on a transverse side portion extending between the lateral side portions of the body;
   a cover comprising a plurality of engagement features corresponding to the plurality of engagement portions that are operative to engage the plurality of engagement portions to secure the cover to the first side of the body in a first configuration and the second side of the body in a second configuration; and
   a plurality of extension members that extend from the cover that align with the engagement portions on the opposite lateral side portions and the transverse side portion of the body in the first configuration and the second configuration.

2. The protective cover system of claim 1, wherein corresponding respective ones of the plurality of extension members and the plurality of engagement portions engage to latch the cover to the body in either the first configuration of the second configuration.

3. The protective cover system of claim 2, wherein the plurality of extension members each extend along at least a portion of the length of opposite side portions of the cover.

4. The protective cover system of claim 3, wherein the extension members extend for a common distance on the respective opposite side portions of the cover.

5. The protective cover system of claim 4, wherein the extension members are mirrored on the opposite sides of the cover to engage correspondingly mirrored engagement portions on the body to facilitate securing the cover to the body in the first configuration and the second configuration.

6. The protective system of claim 5, wherein the cover comprises an outer perimeter that is substantially coextensive with an outer perimeter of the body.

7. The protective cover system of claim 1, wherein the cover is completely removable from the body when converting from the first configuration to the second configuration.

8. The protective cover system of claim 1, wherein the cover extends relative to the recess when in the second configuration to at least partially cover a portion of the opening.

9. The protective cover system of claim 1, wherein the cover comprises a window that, when the cover is in the first configuration, aligns with a hole in the body to provide access to a feature of a device disposed within the recess.

10. The protective cover system of claim 9, wherein the feature comprises a camera lens.

11. A protective cover system for use in protecting a device, comprising:
- a body having a first side and a second side, the body defining a recess having an opening that is open toward the second side, the recess being sized to receive at least a portion of the device therein;
- at least one raised portion extending from the first side of the body;
- a plurality of engagement portions defined by the body;
- a cover comprising a plurality of engagement features corresponding to the plurality of engagement portions that are operative to engage the plurality of engagement portions to secure the cover to the first side of the body in a first configuration and the second side of the body in a second configuration, wherein the cover comprises at least one corresponding recess into which the at least one raised portion extends when the cover is in the first configuration; and
- a panel defined by the cover that extends generally parallel to the first side in the first configuration and the second side in the second configuration, wherein the panel extends relative to the opening when the second configuration to cover at least a majority of the opening.

12. The protective cover system of claim 11, wherein the at least one corresponding recess comprises an aperture extending through an entire thickness of the cover.

13. The protective cover system of claim 12, wherein the at least one raised portion extends through the aperture such that a distal surface of the raised portion is substantially flush with an exterior surface of the cover opposite an interior surface adjacent to the body when the cover is in the first configuration.

14. The protective cover system of claim 12, wherein when in the second configuration, at least a portion of a display of a device disposed within the recess is visible through the aperture.

15. The protective cover system of claim 12, wherein the at least one raised portion comprises at least two raised portions, and wherein the at least one corresponding recess comprises at least two apertures extending through the entire thickness of the cover.

16. The protective cover system of claim 15, wherein the cover defines at least one strut member extending between the at least two apertures, wherein the body defines at least one trench extending between the at least two raised portions, and wherein the at least one strut member is configured to lie within the at least one trench in the first configuration such that the at least one strut is disposed nearer the second side of the body than the distal surface.

* * * * *